(12) United States Patent
Kim et al.

(10) Patent No.: US 9,536,058 B2
(45) Date of Patent: Jan. 3, 2017

(54) APPARATUS AND METHOD FOR MANAGING DIGITAL COPYRIGHT ON EPUB-BASED CONTENT, AND APPARATUS AND METHOD FOR PROVIDING EPUB-BASED CONTENT ACCORDING TO USER'S RIGHT

(71) Applicant: FASOO.COM CO., LTD, Seoul (KR)

(72) Inventors: Eun-Bum Kim, Anseong Si (KR); Chel Park, Seoul (KR); Sun-Young Kim, Seoul (KR)

(73) Assignee: FASOO.COM CO., LTD, Seoul (KR)

( * ) Notice: Subject to any disclaimer, the term of this patent is extended or adjusted under 35 U.S.C. 154(b) by 71 days.

(21) Appl. No.: 14/376,668

(22) PCT Filed: Dec. 27, 2012

(86) PCT No.: PCT/KR2012/011579
§ 371 (c)(1),
(2) Date: Aug. 5, 2014

(87) PCT Pub. No.: WO2013/118968
PCT Pub. Date: Aug. 15, 2013

(65) Prior Publication Data
US 2015/0026456 A1    Jan. 22, 2015

(30) Foreign Application Priority Data
Feb. 8, 2012    (KR) .................. 10-2012-0012648

(51) Int. Cl.
*G06F 21/10* (2013.01)
*G06F 21/00* (2013.01)
*H04L 29/06* (2006.01)

(52) U.S. Cl.
CPC .............. *G06F 21/10* (2013.01); *G06F 21/00* (2013.01); *H04L 63/0471* (2013.01)

(58) Field of Classification Search
CPC ....... G06F 21/00; G06F 21/10; H04L 63/0471
(Continued)

(56) References Cited

U.S. PATENT DOCUMENTS

2003/0041253 A1    2/2003 Matsui et al.
2005/0235163 A1    10/2005 Forlenza et al.
(Continued)

FOREIGN PATENT DOCUMENTS

JP    2000113047 A    4/2000
JP    2004133801 A    4/2004
(Continued)

*Primary Examiner* — Brandon Hoffman
*Assistant Examiner* — Nega Woldemariam
(74) *Attorney, Agent, or Firm* — William Park & Associates Ltd.

(57) ABSTRACT

Disclosed are an apparatus and method for managing a digital copyright on electronic publication (EPUB)-based content and an apparatus and method for providing EPUB-based content according to a user's right. An encryption unit of the apparatus for managing digital copyright generates encrypted unit files by encrypting a plurality of unit files included in content in the form of a compressed archive including the plurality of unit files with different encryption keys, stores the encrypted unit files in a content database, generates mapping data by mapping the encryption keys to pieces of identification information of the encrypted unit files, and stores the mapping data in an encryption key database. A rights management unit transmits an encryption key selected from among the plurality of encryption keys to a content provision apparatus, which decrypts the encrypted unit files and provides the unit files to a user, based on at least one of identification information of the user and identification information of the content included in an encryption key provision request message received from the content provision apparatus.

3 Claims, 10 Drawing Sheets

(58) Field of Classification Search
USPC .................................. 713/150, 151, 152, 153
See application file for complete search history.

(56) References Cited

U.S. PATENT DOCUMENTS

| | | |
|---|---|---|
| 2010/0306122 A1 | 12/2010 | Shaffer |
| 2011/0185179 A1 | 7/2011 | Swaminathan et al. |
| 2011/0231660 A1* | 9/2011 | Kanungo ............... H04N 7/165 713/168 |
| 2013/0124868 A1* | 5/2013 | Sorotokin ............... G06F 21/10 713/176 |

FOREIGN PATENT DOCUMENTS

| | | | |
|---|---|---|---|
| JP | 2009163612 A | 7/2009 |
| JP | 2002353953 A | 12/2012 |
| KR | 1020060128072 A | 12/2006 |
| KR | 1020110016038 A | 2/2011 |

* cited by examiner

FIG. 2

```xml
<?xml version="1.0" encoding="UTF-8" ?>
<package xmlns="http://www.idpf.org/2007/opf"
        xmlns:dc="http://purl.org/dc/elements/1.1/"
        xmlns:xsi="http://www.w3.org/2001/XMLSchema-instance"
        version="2.0"
        unique-identifier="bookid">
    <metadata  xmlns:dc="http://purl.org/dc/elements/1.1/"
     xmlns:opf="http://www.idpf.org/2007/opf">
    <dc:title>백조(白潮)는 흐르는데 별 하나 나 하나</dc:title>
    <dc:creator>홍사용</dc:creator>
    <dc:language  xsi:type="dcterms:RFC3066">ko</dc:language>
    <dc:identifier  id="bookid">urn:uuid:B68F1A55-19F2-DF11
    -9DD5-00137789A8FC</dc:identifier>
    <dc:subject></dc:subject>
    <dc:description></dc:description>
    <dc:publisher>한국저작권위원회</dc:publisher>
    <dc:contributor></dc:contributor>
    <meta  name="cover" content="coverimage"></meta>
    </metadata>

<manifest  xmlns:opf="http://www.idpf.org/2007/opf">
    <item  id="coverimage" href="images/cover.jpg"  media-type
    ="image/jpeg" />
    <item  id="ncx"  href="toc.ncx"  media-type="application/x-
    dtbncx+xml" />
    <item  id="css" href="style.css"  media-type="text/css" />
    <item  id="id_html_cover" href="coverpage.xhtml"  media
    -type="application/xhtml+xml"  />
    <item  id="id_html_2" href="part2.xhtml"  media-type=
    "application/xhtml+xml" />
    <item  id="id_html_3" href="part3.xhtml"  media-type=
    "application/xhtml+xml" />
    <item  id="id_html_4" href="part4.xhtml"  media-type=
    "application/xhtml+xml" />
```

FIG. 3

```
<item    id="id_html_5"  href="part5.xhtml"   media-type=
"application/xhtml+xml" />
<item    id="id_html_6"  href="part6.xhtml"   media-type=
"application/xhtml+xml" />
<item    id="id_html_7"  href="part7.xhtml"   media-type=
"application/xhtml+xml" />
<item    id="id_html_8"  href="part8.xhtml"   media-type=
"application/xhtml+xml" />
<item    id="id_html_9"  href="part9.xhtml"   media-type=
"application/xhtml+xml" />
<item    id="id_html_10" href="part10.xhtml"  media-type=
"application/xhtml+xml" />
<item    id="id_html_11" href="part11.xhtml"  media-type=
"application/xhtml+xml" />
<item    id="id_html_12" href="part12.xhtml"  media-type=
"application/xhtml+xml" />
<item    id="id_html_13" href="part13.xhtml"  media-type=
"application/xhtml+xml" />
</manifest>

<spine   toc="ncx">
  <itemref   idref="id_html_cover" />
  <itemref   idref="id_html_2" />
  <itemref   idref="id_html_3" />
  <itemref   idref="id_html_4" />
  <itemref   idref="id_html_5" />
  <itemref   idref="id_html_6" />
  <itemref   idref="id_html_7" />
  <itemref   idref="id_html_8" />
  <itemref   idref="id_html_9" />
  <itemref   idref="id_html_10" />
  <itemref   idref="id_html_11" />
  <itemref   idref="id_html_12" />
  <itemref   idref="id_html_13" />
  </spine>
</package>
```

FIG. 4

```
<?xml version="1.0" encoding="UTF-8" ?>
<!DOCTYPE html PUBLIC "-//W3C//DTD XHTML 1.1//EN" "http://www.
w3.org/TR/xhtml11/DTD/xhtml11.dtd">
<html xmlns="http://www.w3.org/1999/xhtml" xml:lang="ko">
    <head>
        <meta http-equiv="content-type" content="text/html;
        charset=UTF-8" />
        <title>COVER PAGE</title>
        <link href="style.css" type="text/css" rel="stylesheet" />
    </head>
    <body>
        <p><img src="images/cover.jpg" alt="cover_page" >
        </img></p>
    </body>
</html>
```

FIG. 5

```
<?xml version="1.0" encoding="UTF-8" ?>
<!DOCTYPE html PUBLIC "-//W3C//DTD
XHTML 1.1//EN"
"http://www.w3.org/TR/xhtml11/DTD/xhtml11.dtd">
<html xmlns="http://www.w3.org/1999/xhtml" xml:lang="ko">
    <head>
        <meta http-equiv="content-type" content="text/html;
        charset=UTF-8" />
        <title>1. 그 시절</title>
        <link href="style.css" type="text/css" rel="stylesheet" />
    </head>
    <body>
        <div style="text-align:left">
<p ><span class="textStyle2">1. 그 시절</span></p>
<p ><span class="textStyle1"> "여러분이 오시니 종로거리가 새파랗구려."
이것은 방소파(方小坡)군이 그 어느 해 여름날 백조 동인들을 철물교(鐵物橋)에
서 만나서 부러운 듯이 칭찬하는 말이었다. —.</span></p>
<p ><span class="textStyle1">오 — 그리울손 그 시절! 백조(白潮)가 흐르던
그 시절!</span></p>
<p ><span class="textStyle1"> 도향의 그 때 나이는 아마 열아홉살이었던가
한다.</span></p>
중략…
<p ><span class="textStyle1">배탈이나 감기 한번 아니 앓고 혈색 좋게
뛰놀고 기운차게 떠들었었다.

<br /></span><br /><br />
</p>
<p><br /><br /><br /><br /><br /><br /></p> </div>
    </body>
</html>
```

APPARATUS AND METHOD FOR MANAGING DIGITAL COPYRIGHT ON EPUB-BASED CONTENT, AND APPARATUS AND METHOD FOR PROVIDING EPUB-BASED CONTENT ACCORDING TO USER'S RIGHT

TECHNICAL FIELD

The present invention relates to an apparatus and method for managing digital copyright on electronic publication (EPUB)-based content and an apparatus and method for providing EPUB-based content according to a user's right, and more particularly, to an apparatus and method for controlling a user's access to content created to conform to an EPUB standard according to the user's right.

BACKGROUND ART

Electronic publication (EPUB) is a free and open e-book standard that is adopted as a public standard to replace the Open e-Book standard that precedes September 2007 by International Digital Publishing Forum (IDPF). Since EPUB-based content is designed as reflowable content, it can be automatically optimized for the form and the size of a display device and provided to a user.

The specifications of EPUB include three definitions of open publication structure (OPS) 2.0, open packaging format (OPF) 2.0, and open e-book publication structure (OEBPS) container format (OCF) 2.0. The OPS is the uppermost-level definition of the EPUB format, and includes the definition of a modularization specification of EPUB content, the definition of a style sheet, the definition of limited use of extensible hypertext markup language (XHTML) or extensible markup language (XML), and so on. The OPF defines metadata generated in the OCF according to an OCF standard, an order of reading, and a mechanism for an information-searching operation, and the OCF specifies the general definition of a container technology of EPUB content.

Referring to the physical configuration of an EPUB file, EPUB-based content is in the form of a single file having the extension ".epub," and several components (directories and files) are compressed into the single file by a compression mechanism. The root of an EPUB file includes a "mimetype.xml" file, a META-INF directory, and an OEBPS directory.

FIG. 1 is a diagram showing an OEBPS directory structure of an EPUB file. Referring to FIG. 1, the OCF defines that content to be actually read by users is located in an OEBPS directory in the form of an XHTML file.

As shown in FIG. 1, the OPF is embodied as a "content.opf" file in the OEBPS directory. The "content.opf" file includes metadata, the order of files containing content to be read by a user, a style to be presented, and navigational information that can be used by a device, such as an EPUB reader, or an application program.

Meanwhile, in connection with digital rights management (DRM) of content provided in the form of an e-book, such as EPUB-based content, IDPF has no standard enforcing DRM of EPUB-based content but has recommendations based on XML security standards of the world wide web consortium (W3C).

When encryption of e-book content is performed while the EPUB standard of IDPF is satisfied, it is recommended to generate an "encryption.xml" file containing key information and algorithm information for encrypting a META-INF directory according to the XML security standards of the W3C, generate a "signature.xml" file containing information on an e-signature for preventing forgery and falsification of content, and generate a "rights.xml" file for control of a content user's right. Here, the content of encryption, e-signature, and right control does not designate a single algorithm but suggests recommendations to use a specific algorithm and rights expression language.

The copyright protection of e-book content, such as EPUB-based content, becomes problematic because a content provider gives users rights to be provided with content in stages according to the users, or intends to prevent a non-allowed user from accessing content. However, as mentioned above, IDPF merely suggests recommendations for copyright protection and has no standardized algorithm for copyright protection. Therefore, there is a need for a copyright management algorithm that can be applied to EPUB.

An existing EPUB copyright protection system employs a method of encrypting a whole .epub file using one encryption key or separately encrypting components of an .epub file using one encryption key. Therefore, it is impossible to provide content in stages according to access rights.

Korean Unexamined Patent Application Publication No. 2003-0097465 discloses a DRM system that makes it possible to encrypt digital content using an encryption key and decrypt the digital content by getting a license, and US Unexamined Patent Application Publication No. 2010-0088746 discloses a system that maintains security by displaying only parts of a document according to access rights to confidential documents. However, all the existing technologies provide only security methods for general digital content and are irrelevant to a copyright protection algorithm for EPUB content.

DISCLOSURE

Technical Problem

The present invention is directed to providing an apparatus and method for managing digital copyright on electronic publication (EPUB)-based content which can encrypt EPUB-based content according to an EPUB standard set up by International Digital Publishing Forum (IDPF) and provide the content in stages according to users' access rights.

The present invention is also directed to providing a computer-readable recording medium storing a program for instructing a computer to execute a method of managing digital copyright on EPUB-based content which can encrypt EPUB-based content according to an EPUB standard set up by IDPF and provide the content in stages according to users' access rights.

The present invention is also directed to providing an apparatus and method for providing EPUB-based content according to a user's right which can provide EPUB-based content to users using licenses issued in stages according to the users' access rights.

The present invention is also directed to providing a computer-readable recording medium storing a program for instructing a computer to execute a method of providing EPUB-based content according to a user's right which can provide EPUB-based content to users using licenses issued in stages according to the users' access rights.

Technical Solution

One aspect of the present invention provides an apparatus for managing digital copyright on EPUB-based content, the apparatus including: an encryption unit configured to generate encrypted unit files by encrypting a plurality of unit files, included in content in the form of a compressed archive including the plurality of unit files, with different encryption keys, store the encrypted unit files in a content database, generate mapping data by mapping the encryption keys to pieces of identification information of the encrypted unit files, and store the mapping data in an encryption key database; and a rights management unit configured to transmit an encryption key selected from among the plurality of encryption keys to a content provision apparatus, which decrypts the encrypted unit files and provides the unit files to a user, based on at least one of identification information of the user and identification information of the content included in an encryption key provision request message received from the content provision apparatus.

Another aspect of the present invention provides a method of managing digital copyright on EPUB-based content, the method including: (a) generating encrypted unit files by encrypting a plurality of unit files, included in content in the form of a compressed archive including the plurality of unit files, with different encryption keys, storing the encrypted unit files in a content database, generating mapping data by mapping the encryption keys to pieces of identification information of the encrypted unit files, and storing the mapping data in an encryption key database; and (b) transmitting an encryption key selected from among the plurality of encryption keys to a content provision apparatus, which decrypts the encrypted unit files and provides the decrypted unit files to a user, based on at least one of identification information of the user and identification information of the content included in an encryption key provision request message received from the content provision apparatus.

Another aspect of the present invention provides an apparatus for providing EPUB-based content according to a user's right, the apparatus including: an encryption key request unit configured to access a digital rights management (DRM) apparatus of content, which is in the form of a compressed archive including a plurality of encrypted unit files generated by encrypting a plurality of unit files with different encryption keys, based on path information included in the content, and request the encryption keys for decrypting the encrypted unit files; a decryption unit configured to decrypt an encrypted unit file corresponding to an encryption key received from the DRM apparatus; and a display unit configured to render the decrypted unit file and output the rendered unit file through a display device.

Another aspect of the present invention provides a method of providing EPUB-based content according to a user's right, the method including: (a) accessing a DRM apparatus of content, which is in the form of a compressed archive including a plurality of encrypted unit files generated by encrypting a plurality of unit files with different encryption keys, based on path information included in the content, and requesting the encryption keys for decrypting the encrypted unit files; (b) decrypting an encrypted unit file corresponding to an encryption key received from the DRM apparatus; and (c) rendering the decrypted unit file and outputting the rendered unit file through a display device.

Advantageous Effects

An inventive apparatus and method for managing digital copyright on electronic publication (EPUB)-based content and an inventive apparatus and method for providing EPUB-based content according to a user's right provide a user with EPUB content whose components are encrypted with different encryption keys, and thus it is possible to adaptively provide the whole or a part of the EPUB content by setting the user's access right in stages.

DESCRIPTION OF DRAWINGS

FIGS. 2 and 3 show an example of the detailed content of a "content.opf" file.

FIGS. 4 and 5 show examples of configurations of extensible hypertext markup language (XHTML) files.

MODE FOR INVENTION

Hereinafter, exemplary embodiments of an inventive apparatus and method for managing digital copyright on electronic publication (EPUB)-based content and an inventive apparatus and method for providing EPUB-based content according to a user's right will be described in detail with reference to the accompanying drawings.

The description of a detailed configuration of EPUB content first will be followed by the description of detailed operations of the present invention applied to such EPUB content.

Figure 1:
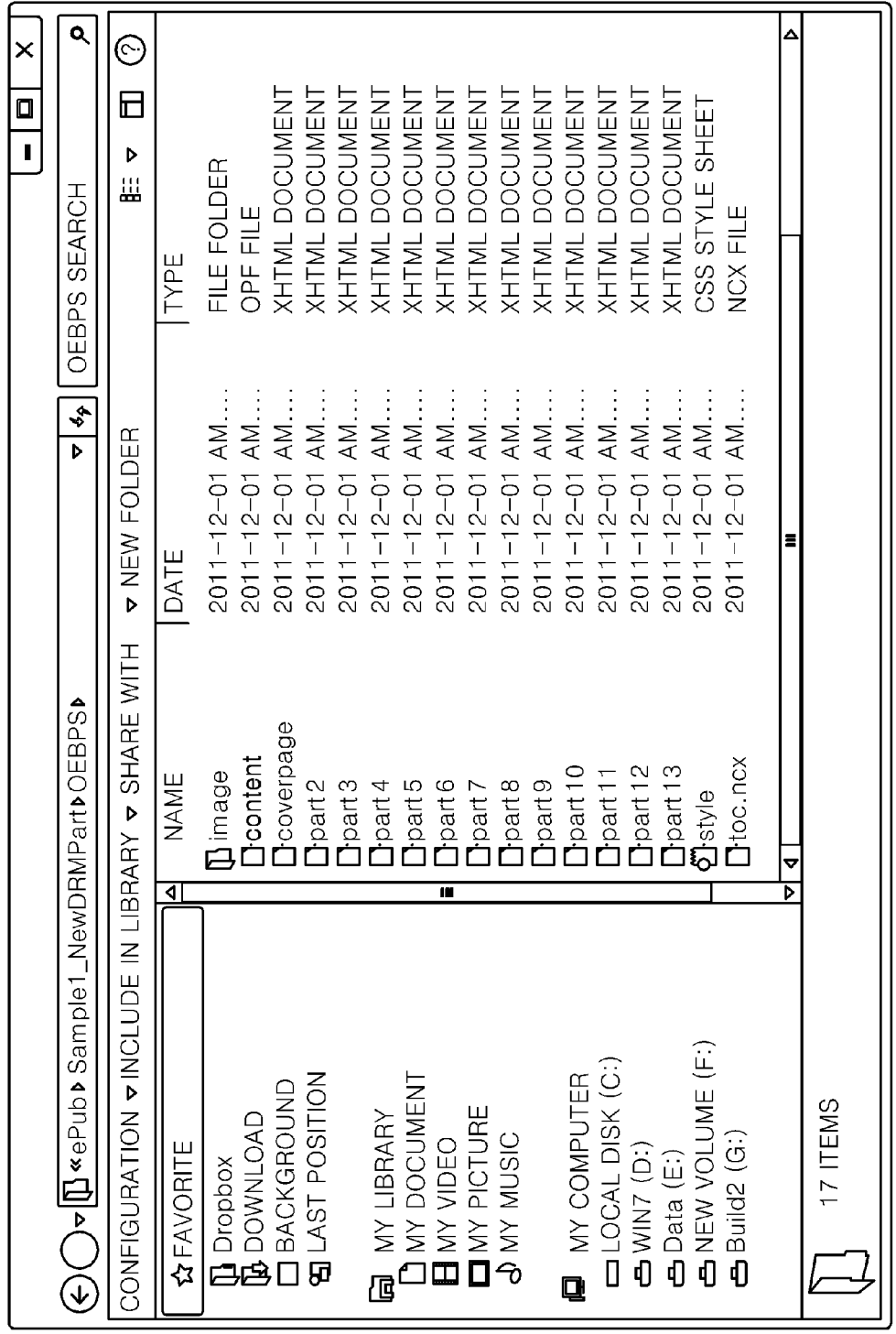
FIG. 1 shows an open e-book publication structure (OEBPS) directory structure of an electronic publication (EPUB) file.

As shown in FIG. 1, the order in which extensible hypertext markup language (XHTML) files constituting EPUB content are displayed on a display device, such as an EPUB reader, is defined in a content.opf file in an open e-book publication structure (OEBPS) directory.

FIGS. 2 and 3 show an example of the detailed content of a "content.opf" file. Referring to FIGS. 2 and 3, in a <manifest> element of a "content.opf" file, an identification (ID) is given to each XHTML file to be displayed on a display device, and in a <spine> element, the display order of XHTML files is set. In the example of FIGS. 2 and 3, first of all, a "coverpage.xhtml" file is displayed on a display device, and then, "part2.xhtml" and "part3.xhtml" files are sequentially displayed.

XHTML files included in the OEBPS directory of FIG. 1 include content that will be actually displayed through a display device and provided to a user. As mentioned above, presentation of EPUB content may vary according to the form of a display device, such as an EPUB reader. For example, content included in one XHTML file may be shown on one page in an A display device and in several pages on a B display device.

However, when pieces of content included in different XHTML files are displayed on a display device, the pieces of content are separately displayed on different pages regardless of the lengths of the pieces of content included in the files. In the example of FIG. 2, when a "part3.xhtml" file is output to a display device after a "part2.xhtml" file is output, the content of the "part2.xhtml" file is displayed on one page and the content of the "part3.xhtml" file is forcibly displayed in the next page regardless of the length of the "part2.xhtml" file.

FIGS. 4 and 5 show examples of configurations of XHTML files. FIG. 4 shows an XHTML file including content for outputting a cover page of an e-book on a display device, and an "images/cover.jpg" file is displayed as a cover of an e-book on a display device. Also, FIG. 5 shows an XHTML file including content corresponding to the body of EPUB content, and the body content of an e-book is displayed on a display device.

An apparatus for managing digital copyright on EPUB-based content (referred to as a "digital rights management (DRM) apparatus" below) according to the present invention effectively encrypts all pieces of EPUB content while conforming to the above-described standard of EPUB-based e-books, and makes it possible to partially access the content of an e-book according to a user's access right. The DRM apparatus may be implemented in a content server that receives a content provision request from a program installed in a content play device through which a user can be provided with EPUB content, such as an EPUB reader or a computer having a display device, and provides encrypted content.

Also, an apparatus for providing EPUB-based content according to a user's right (referred to as a "content provision apparatus" below) according to the present invention may be implemented in the form of an EPUB reader, a content play device, or a program. After requesting content from a content server, the content provision apparatus may decrypt encrypted content and display the content, thereby providing the content to a user.

Operations of a DRM apparatus and a content provision apparatus for providing a user with EPUB-based content will be described as a typical embodiment of the present invention. However, the present invention is not limited to EPUB-based content, and can be applied to any content in the form of a compressed archive including a plurality of unit files, such as EPUB content.

Figure 6:
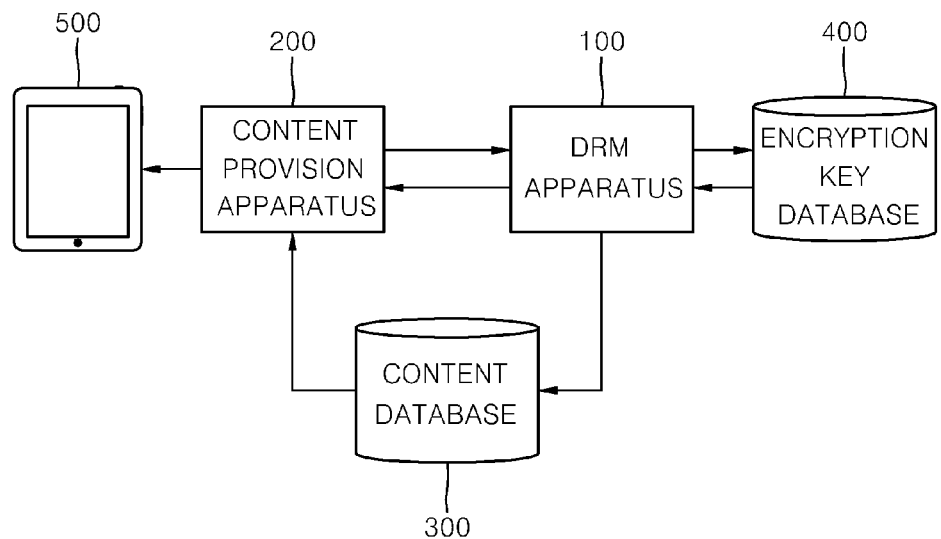
FIG. 6 is a diagram showing a system for providing EPUB-based content including both a digital rights management (DRM) apparatus and a content provision apparatus according to the present invention.

FIG. 6 is a diagram showing a system for providing EPUB-based content including both a DRM apparatus and a content provision apparatus according to the present invention.

Referring to FIG. 6, a content provision system includes a DRM apparatus 100 and a content provision apparatus 200 according to the present invention. The DRM apparatus 100 encrypts content to be provided to a user, preferably, EPUB-based content, and stores the encrypted content in a content database 300. An encryption key used for encryption is stored in an encryption key database 400. When a request for provision of the encryption key for decrypting the encrypted content is received from the content provision apparatus 200, the DRM apparatus 100 determines the user's right using user identification information included in the encryption key provision request, and transmits the encryption key to the content provision apparatus 200 according to a determination result.

Also, the content provision apparatus 200 reads the encrypted content from the content database 300 at the user's request, decrypts the content, and outputs the decrypted content through a display device 500, thereby providing the content to the user. The encryption key used in decryption may be acquired by transmitting an encryption key provision request message to the DRM apparatus 100, and the content provision apparatus 200 includes the user identification information in the encryption key provision request message and thus can provide the user with the whole or a part of the content using the encryption key adaptively provided according to the user's access right to the content.

Figure 7:
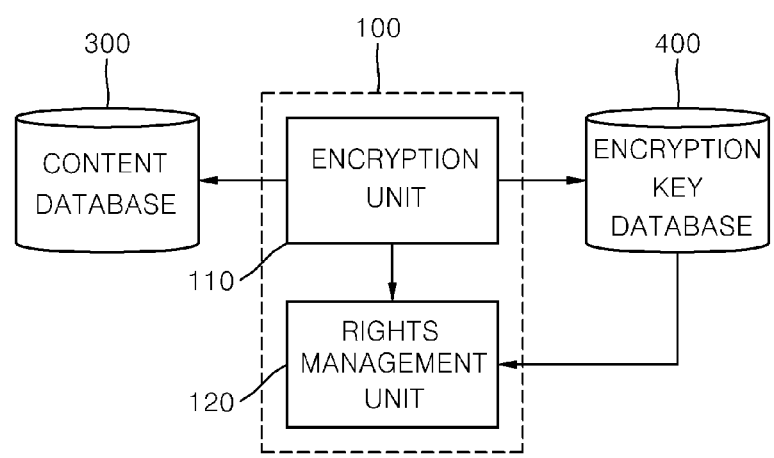
FIG. 7 is a block diagram showing a configuration of a DRM apparatus according to an exemplary embodiment of the present invention.

FIG. 7 is a block diagram showing a configuration of the DRM apparatus 100 according to an exemplary embodiment of the present invention.

Referring to FIG. 7, the DRM apparatus 100 according to the present invention includes an encryption unit 110 and a rights management unit 120.

The encryption unit 110 encrypts content in the form of a compressed archive including a plurality of unit files, such as EPUB-based content, and stores the encrypted content in the content database 300. Also, the encryption unit 110 stores an encryption key used to encrypt the content in the encryption key database 400. The plurality of unit files included in the content are encrypted with different encryption keys, and the encryption keys are mapped to identification numbers of the unit files encrypted by the encryption keys, so that mapping data is generated. Subsequently, the mapping data is stored in the encryption key database 400. In the mapping data, the plurality of encryption keys are mapped to the identification numbers of the plurality of encrypted unit files on a one-to-one basis.

Specifically, an exemplary embodiment in which each component of EPUB-based content is encrypted by the encryption unit 110 will be described. As described above, EPUB content includes a plurality of XHTML files, and thus the encryption unit 110 generates as many encryption keys as the number of XHTML files to encrypt each of the XHTML files. This is intended to enable a user to access the content in stages according to the user's access right.

As described above, International Digital Publishing Forum (IDPF) recommends generation of an "encryption.xml" file, which is an encryption information file including information on keys and an algorithm used for encryption, etc., upon encryption of content in connection with copyright protection of EPUB-based content. However, the encryption unit 110 does not include the generated encryption keys directly in the "encryption.xml" file but stores the generated encryption keys in the encryption key database 400. Also, the encryption unit 110 records only the user acquiring the EPUB-based content, that is, information on a path in which the content provision apparatus 200 can acquire the encryption keys, in the "encryption.xml" file by linking the user to the "encryption.xml" file. The path information for acquiring the encryption keys denotes address information, etc., enabling access to the DRM apparatus 100 according to the present invention.

To encrypt the EPUB content, the encryption unit 110 analyzes the structure of the EPUB content, and selects components to be encrypted, that is, unit files constituting the EPUB content. A process of separating each component from the EPUB content is performed in stream units, and each stream is encrypted with a randomly generated symmetric key-encryption key.

Figure 8:
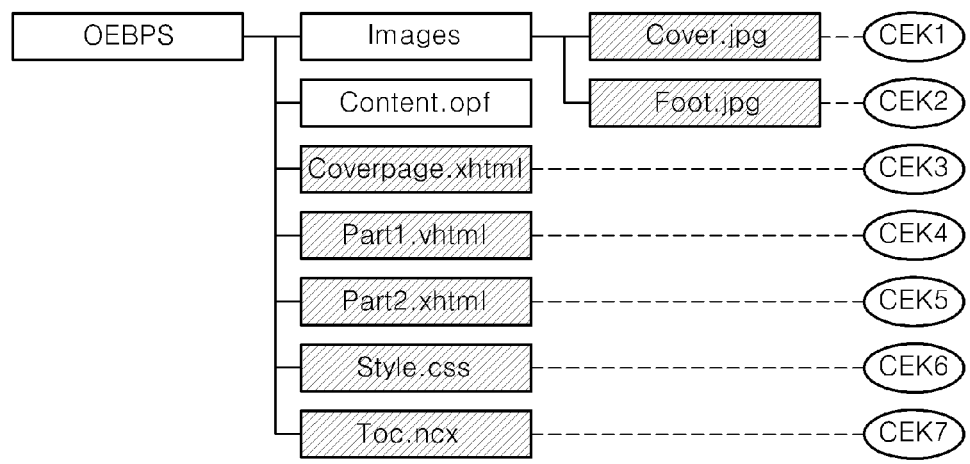
FIG. 8 shows an example of encryption-target components in an OEBPS directory.

FIG. 8 shows an example of encryption-target components in an OEBPS directory. Referring to FIG. 8, all files other than "content.opf" in an OEBPS directory can be encrypted with different encryption keys. In FIG. 6, content encryption key 1 (CEK1) to CEK7 denote different CEKs.

The encryption unit 110 generates mapping data by mapping the encryption keys used in the encryption process of respective streams to identification information of the streams on a one-to-one basis, and then stores the generated mapping data in the encryption key database 400. When encryption of all the streams is completed, the encryption unit 110 structuralizes the encrypted streams as components of the EPUB content, and then stores the structuralized streams in the content database 300 according to an EPUB content standard.

At a request of a user, the content provision apparatus 200 that displays content to provide the content to a user accesses the content database 300 and reads an encrypted EPUB file by downloading the encrypted EPUB file or using other methods. The read EPUB file is decrypted and then displayed through the display device 500, thus being provided to the user. However, since information on the encryption keys for decryption is not included in the EPUB content, the content provision apparatus 200 should be additionally provided with information relating to the encryption keys from the DRM apparatus 100 according to the present invention and decrypt the respective components of the encrypted EPUB content.

The rights management unit 120 transmits a selected encryption key among the plurality of encryption keys to the content provision apparatus 100 based on identification information of the user included in an encryption key provision request received from the content provision apparatus 200. At this time, the rights management unit 120 encrypts the selected encryption key, and may provide the encryption key by issuing a license including information on an EPUB content corresponding to the encryption key to the content provision apparatus 200.

Since the plurality of encryption keys corresponding to the XHTML files have been used when the encryption unit 110 encrypts the EPUB content, a user requires all the encryption keys used for encryption to see the whole EPUB content. Using this condition, in the present invention, a user's access right to content is determined from identification information of the user, and all or some of the encryption keys are provided according to the access right, so that the user can access only a part of the content in some cases.

The rights management unit 120 determines an encryption key to be transmitted to the content provision apparatus 200 based on at least one of the content identification information and the user identification information included in the encryption key provision request message. To this end, a user authentication process of determining whether or not the user has a right to access the content from at least one of the user identification information and the content identification information is performed. User authentication may be directly performed by the rights management unit 120, or performed by a separate user authentication module (not shown) at a request of the rights management unit 120.

When user authentication is performed by the user authentication module (not shown), the rights management unit 120 requests user authentication by transmitting at least one of the content identification information and the user identification information included in the encryption key provision request message, and the user authentication module (not shown) provides a user authentication result to the rights management unit 120. Here, the user authentication result includes whether or not the user can access the EPUB content, whether or not the user can access the whole EPUB content when the user can access the EPUB content, information on accessible content components when the user can access only a part of the EPUB content, and so on. For such user authentication, access rights set in advance according to respective pieces of user identification information may be stored according to pieces of content, and such information may be stored in the user authentication module (not shown) or a separate content management module (not shown).

The rights management unit 120 directly performs user authentication, or selects an encryption key to be transmitted to the content provision apparatus 200 from among the plurality of encryption keys in order to issue a license according to a user authentication result obtained from the user authentication module (not shown) performing user authentication. When the user has a right to access only some components of the content, it is possible to select encryption keys corresponding to the identification information of accessible XHTML files from the encryption key database 400.

When an obtained user authentication result indicates that the user has no right to access the content, the rights management unit 120 selects no encryption key and can transmit only a license issuance rejection message indicating that no encryption key can be provided to the content provision apparatus 200.

Meanwhile, as mentioned above, the rights management unit 120 may acquire a selected encryption key from the encryption key database 400, encrypt the encryption key, and then insert the encrypted encryption key in the license. At this time, user authentication information, such as a public key and a certificate of the user, can be used for encryption of the encryption key. Also, the rights management unit 120 can insert a component of the EPUB content corresponding to the encrypted encryption key, that is, information on an XHTML file encrypted with the encryption key, in the license, and may map the user's usage right of the content to the encrypted encryption key and the corresponding XHTML file information.

Finally, the rights management unit 120 encrypts the license and transmits the encrypted license to the content provision apparatus 200. The content provision apparatus 200 decrypts the issued license, decrypts the encryption key included in the license with user information, and uses the encryption key to decrypt the EPUB content. When only encryption keys corresponding to some components of the EPUB content are included in the license, the content provision apparatus 200 decrypts only XHTML files corresponding to the included encryption keys and outputs the XHTML files to the display device 500, so that the user can see only a part of the EPUB content. On the other hand, when all the encryption keys used to encrypt the components of the EPUB content are included in the license, the user can be provided with the whole EPUB content through the display device 500.

Figure 9:
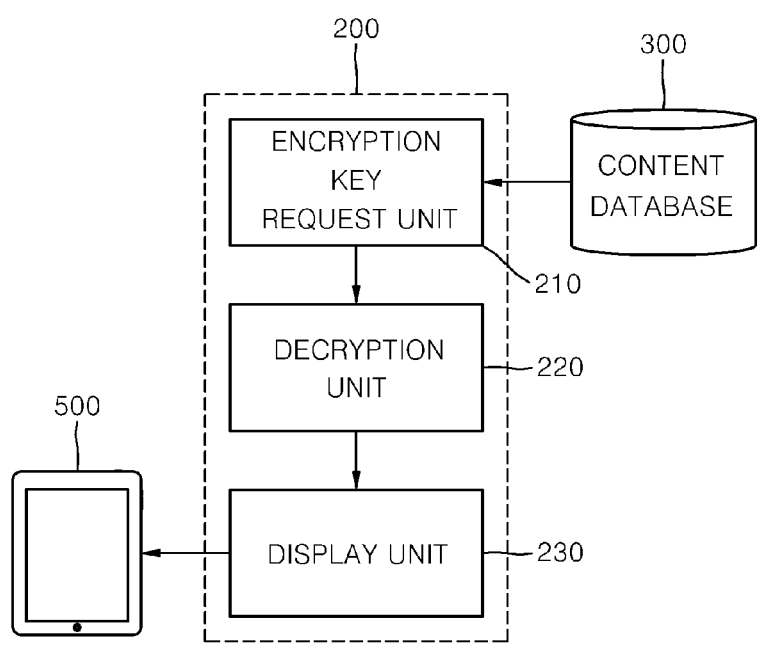
FIG. 9 is a block diagram showing a configuration of a content provision apparatus according to an exemplary embodiment of the present invention.

FIG. 9 is a block diagram showing a configuration of the content provision apparatus 200 according to an exemplary embodiment of the present invention. The content provision apparatus 200 can be implemented in the form of different terminal devices, such as an EPUB reader or a computer, and may be implemented in the form of a recording medium storing an application program.

Referring to FIG. 9, the content provision apparatus 200 according to the present invention includes an encryption key request unit 210, a decryption unit 220, and a display unit 230.

The encryption key request unit 210 reads content in the form of a compressed archive including a plurality of encrypted unit files generated by encrypting a plurality of unit files from the content database 300, accesses a management server that supplies content, that is, the DRM apparatus 100 according to the present invention, based on path information included in the content to request encryption keys for decrypting the respective encrypted unit files.

As described above, when requesting encryption keys, the encryption key request unit 210 transmits at least one of content identification information and user identification information, so that the DRM apparatus 100 can determine a user's access right to content. Also, the encryption key request unit 210 can transmit user information that will be used by the DRM apparatus 100 to encrypt encryption keys together with an encryption key provision request message.

A process in which the DRM apparatus 100 determines a user's access right, selects an encryption key, and then issues a license has already been described above, and thus the detailed description thereof will be omitted.

The decryption unit 220 decrypts respective components of the EPUB content, that is, the encrypted unit files, using an encryption key included in a license issued by the DRM apparatus 100. In the license, an encryption key is included together with information on an encrypted component corresponding to the encryption key and information on a usage right enabling access to the corresponding component, and can be used in the decryption process. When a message indicating that no license can be issued is received from the DRM apparatus 100 or no encryption key is included in the issued license, the decryption unit 220 cannot process the EPUB content, and thus the process of processing the EPUB content is finished as it is.

When a license analysis result of the decryption unit 220 indicates that at least one encryption key is included, the decryption unit 220 analyzes the structure of the EPUB content to analyze a non-encrypted opf file first, lists components included in the opf file in display order of the respective components, and then decrypts the respective components.

According to a detailed decryption order, the decryption unit 220 decrypts and analyzes a style sheet first and then a table of contents (TOC). Subsequently, the decryption unit 220 decrypts resource components, such as an image. Lastly, XHTML files including the body of the EPUB content are decrypted and analyzed.

The decryption process is repeatedly performed until all encryption keys included in the license are used or all the components of the EPUB content are decrypted.

The display unit 230 outputs a stream obtained by the decryption unit 220 decrypting a component of the EPUB content through the display device 500, thereby providing the stream to the user. In the display process of the EPUB content, a rendering process is performed. The rendering process can be performed by a separate renderer (not shown) or the display unit 230. In particular, an XHTML file is mapped to usage rights for reading, printing, editing, etc., in the decryption process, and thus these usage rights are taken into consideration during rendering. For example, when only a right to read a specific page of EPUB content is given to a user, the display unit 230 may output an XHTML file corresponding to the page to the display device 500 so that the XHTML file is displayed on a screen in a read-only state.

Figure 10:
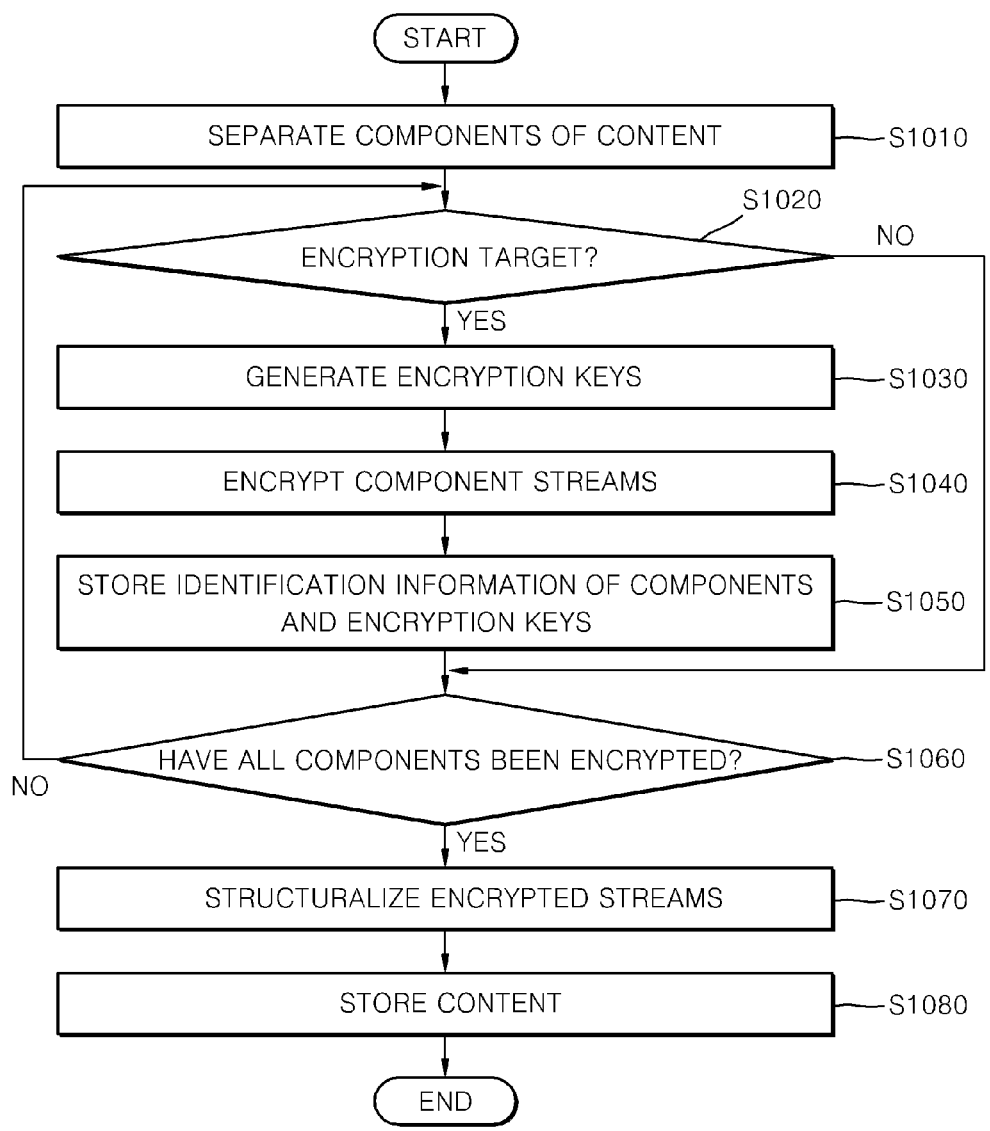
FIG. 10 is a flowchart illustrating a process of encrypting content and storing the encrypted content in a method of managing digital copyright on EPUB-based content according to an exemplary embodiment of the present invention.

FIG. 10 is a flowchart illustrating a process of encrypting content and storing the encrypted content in a method of managing digital copyright on EPUB-based content according to an exemplary embodiment of the present invention. This process can be performed by the above-described DRM apparatus 100 according to the present invention.

Referring to FIG. 10, the DRM apparatus 100 separates unit files, which are components of content in the form of a compressed archive including the plurality of unit files, preferably, EPUB-based content, into the form of streams (S1010). When the separated components are encryption targets (S1020), the DRM apparatus 100 generates encryption keys corresponding to the components (S1030), and encrypts the components in the form of streams with the generated encryption keys (S1040). Therefore, the plurality of components included in the EPUB content can be decrypted with the different encryption keys. The encryption keys used for encryption are stored in the encryption key database 400 together with the identification information of the corresponding components (S1050).

When encryption of all the components of the EPUB content is completed (S1060), the DRM apparatus 100 structuralizes the encrypted streams according to the structure of the EPUB standard (S1070), and stores the structuralized streams in the content database 300 (S1080).

Figure 11:
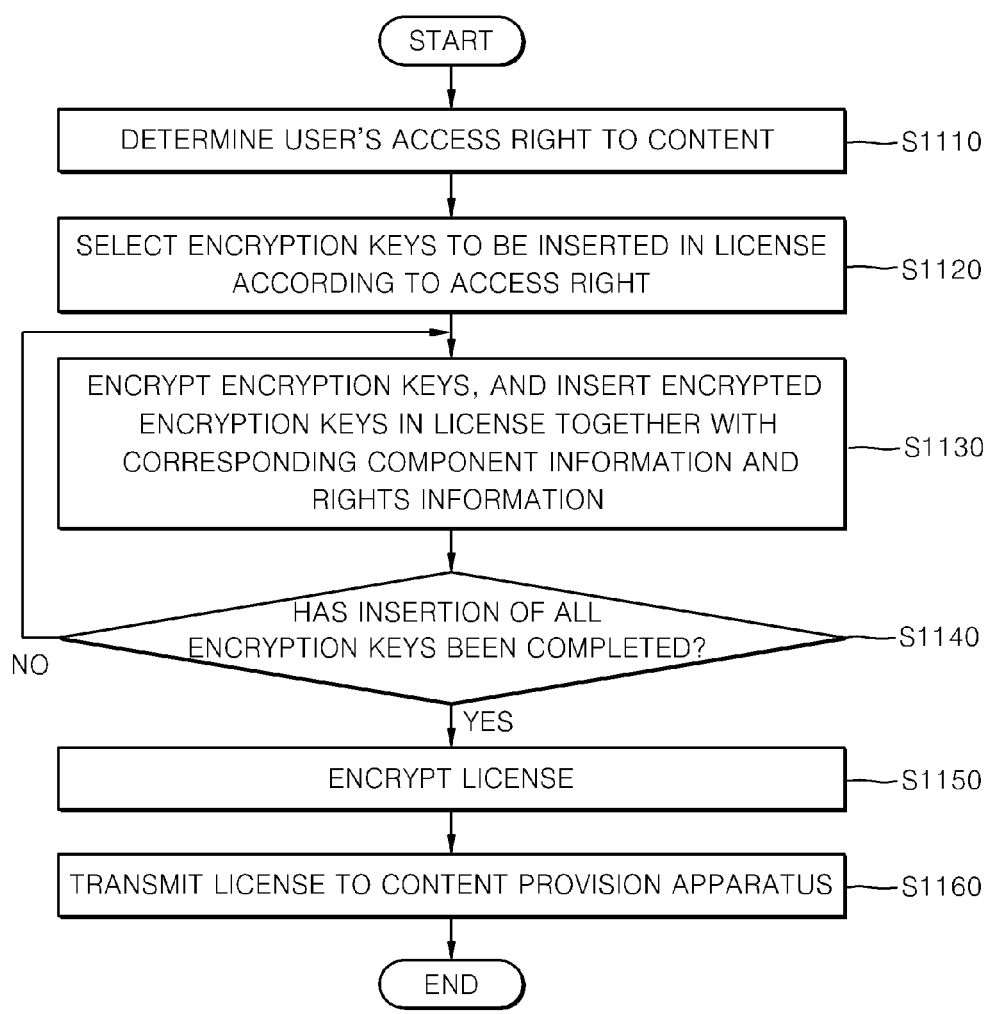
FIG. 11 is a flowchart illustrating a process of issuing a license to use content in a method of managing digital copyright on EPUB-based content according to an exemplary embodiment of the present invention.

FIG. 11 is a flowchart illustrating a process of issuing a license to use content in a method of managing digital copyright on EPUB-based content according to an exemplary embodiment of the present invention. The license issuance process can also be performed by the above-described DRM apparatus 100 according to the present invention.

Referring to FIG. 11, the DRM apparatus 100 determines a user's access right to EPUB content based on at least one of content identification information and user identification information included in an encryption key provision request message for decrypting the EPUB content (S1110). Next, the DRM apparatus 100 adaptively selects encryption keys that will be provided to the user by the encryption key database 400 according to the user's access right (S1120). When the user has an access right to only a part of the EPUB content, only encryption keys corresponding to components of the corresponding part are selected.

The DRM apparatus 100 encrypts the selected encryption keys, and then inserts the encrypted encryption keys in a license together with information on the corresponding components and information on the user's usage right of the content (S1130). A process of encrypting an encryption key and inserting the encrypted key in a license is performed for each of the selected encryption keys in sequence, and when all the selected encryption keys are inserted in the license (S1140), the DRM apparatus 100 encrypts the license (S1150), and transmits the encrypted license to the content provision apparatus 200 (S1160).

Figure 12:
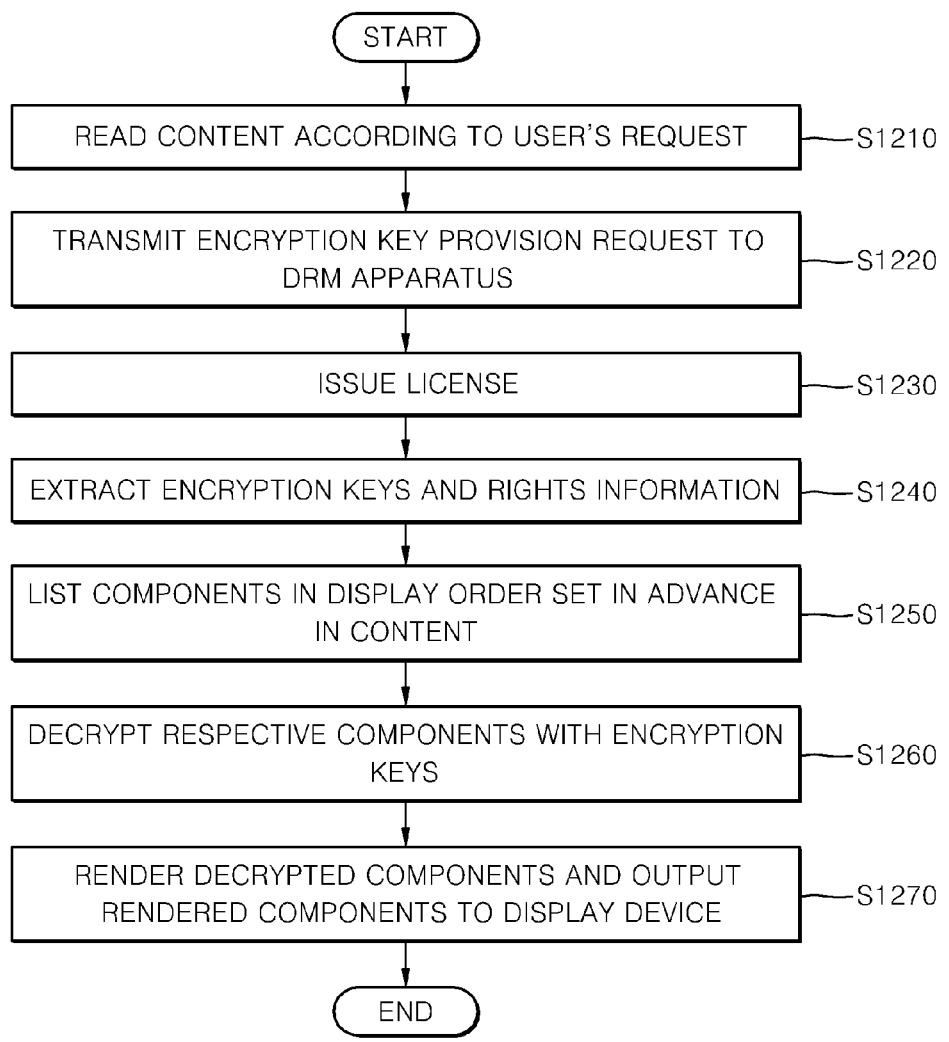
FIG. 12 is a flowchart illustrating a process of performing a method of providing EPUB-based content according to a user's right according to an exemplary embodiment of the present invention.

FIG. 12 is a flowchart illustrating a process of performing a method of providing EPUB-based content according to a user's right according to an exemplary embodiment of the present invention. The process illustrated in FIG. 12 can be performed by the above-described content provision apparatus 200 according to the present invention.

Referring to FIG. 12, the content provision apparatus 200 reads EPUB content corresponding to a request of a user from the content database 300 according to an input of the user (S1210). Since the read EPUB content consists of encrypted components, the content provision apparatus 200 includes at least one of content identification information and user identification information in an encryption key provision request message and transmits the encryption key provision request message to the DRM apparatus 100 according to the present invention (S1220).

Information on an access path to the DRM apparatus 100 in which it is possible to be provided with encryption keys is included in the EPUB content read from the content database 300. Therefore, an "encryption.xml" file including the access path is included in the EPUB content without being encrypted.

When a license is issued by the DRM apparatus 100 through the process described above with reference to FIG. 11 (S1230), the content provision apparatus 200 extracts encryption keys and rights information from the issued license (S1240), and lists encrypted components of the EPUB content in display order of the components set in advance as an opf file in the EPUB content (S1250).

The components are decrypted with the encryption keys in list order (S1260), and the content provision apparatus 200 renders the decrypted components and outputs the rendered components to the display device 500 (S1270), so that the user can be provided with the whole or a part of the EPUB content.

The present invention can be implemented as computer-readable codes in a computer-readable recording medium. The computer-readable recording medium includes all types of recording media storing data that can be read by a computer system. Examples of the computer-readable recording medium include a read-only memory (ROM), a random access memory (RAM), a compact disc ROM (CD-ROM), a magnetic tape, a floppy disk, an optical data storage, and so on. The computer-readable recording medium can also be implemented in the form of carrier waves (e.g., transmission via the Internet). In addition, the computer-readable recording medium can be distributed to computer systems connected via a network, in which computer-readable codes can be stored and executed in a distributed manner.

While the invention has been shown and described with reference to certain exemplary embodiments thereof, it will be understood by those of ordinary skill in the art that various changes in form and details may be made therein without departing from the spirit and scope of the invention as defined by the appended claims.

The invention claimed is:

1. A method of managing digital copyright performed by an apparatus for managing digital copyright, the apparatus comprising a processor, an non-transitory, computer-readable recording medium and computer-readable codes stored in the computer-readable recording medium and executable by the processor, the method comprising:
    separating unit files, which are components of content in the form of a compressed archive including an electronic publication (EPUB) content, into the form of streams;
    generating encryption keys corresponding to the separated components, the separated components being encryption targets;
    encrypting the components in the form of streams with the generated encryption keys, wherein the encryption keys used for encryption are stored in an encryption key database together with identification information of the corresponding components;
    structuralizing the encrypted streams according to the structure of the EPUB standard when encryption of all the components of the EPUB content is completed; and
    storing the structuralized streams in a content database.

2. A method of providing content, performed by a content provision apparatus which includes a processor, a non-transitory, computer-readable recording medium and computer-readable codes stored in the computer-readable recording medium and executable by the processor, the method comprising:
    transmitting an encryption key provision request message for using to decrypt an electronic publication (EPUB) content to a digital rights management (DRM) apparatus managing a content database via a network based on an access path to the DRM apparatus in an "encryption.xml" file included in the EPUB content without being encrypted, wherein the encryption key provision request message includes at least one of content identification information and user identification information;
    receiving a license issued by the DRM apparatus;
    extracting encryption keys and rights information from the issued license; listing encrypted components of the EPUB content in display order of the components set in advance as an open packaging format (OPF) file in the EPUB content;
    decrypting the encrypted components with the encryption keys in list order; and
    rendering the decrypted components and outputting the rendered components to a display device of the content provision apparatus, wherein the outputted components are whole or a part of the EPUB content according to the user's access rights in stages of the outputting.

3. The method of claim 1, further comprising:
    after the storing the structuralized streams,
    receiving an encryption key provision request message for decrypting the EPUB content from a content provision apparatus via a network;
    determining a user's access right to the EPUB content based on at least one of content identification information and user identification information included in the encryption key provision request message;
    adaptively selecting encryption keys to be provided to the user by the encryption key database according to the user's access right, wherein when the user has an access rights to only a part of the EPUB content, only encryption keys corresponding to components of the corresponding part are selected;
    encrypting the selected encryption keys and inserting the encrypted encryption keys in a license together with information on the corresponding components and information on the user's usage rights of the content, wherein a process of the encrypting an encryption key and the inserting the encrypted key in a license is performed for each of the selected encryption keys in sequence;
    encrypting the license when all the selected encryption keys are inserted in the license; and
    transmitting the encrypted license to the content provision apparatus.

* * * * *